US007715434B2

(12) United States Patent
Fischer et al.

(10) Patent No.: US 7,715,434 B2

(45) Date of Patent: May 11, 2010

(54) MANAGING AN ACCESS POINT IN THE PRESENCE OF SEPARATE PROTOCOLS THAT SHARE THE SAME COMMUNICATIONS CHANNEL

(76) Inventors: Michael Andrew Fischer, 22 Inwood Manor, San Antonio, TX (US) 78248-1632; Timothy Gordon Godfrey, 12839 King St., Overland Park, KS (US) 66213

( * ) Notice: Subject to any disclaimer, the term of this patent is extended or adjusted under 35 U.S.C. 154(b) by 1285 days.

(21) Appl. No.: 10/861,064

(22) Filed: Jun. 4, 2004

(65) Prior Publication Data

US 2005/0025174 A1 Feb. 3, 2005

Related U.S. Application Data

(60) Provisional application No. 60/491,214, filed on Jul. 30, 2003.

(51) Int. Cl.
*H04J 3/16* (2006.01)

(52) U.S. Cl. ...................................................... 370/469

(58) Field of Classification Search ....................... None
See application file for complete search history.

(56) References Cited

U.S. PATENT DOCUMENTS

| | | | | |
|---|---|---|---|---|
| 6,895,255 | B1 * | 5/2005 | Bridgelall | 370/329 |
| 7,016,372 | B2 * | 3/2006 | Haartsen | 370/461 |
| 7,031,274 | B2 * | 4/2006 | Sherman | 370/321 |
| 7,039,358 | B1 * | 5/2006 | Shellhammer et al. | 455/41.2 |
| 7,050,452 | B2 * | 5/2006 | Sugar et al. | 370/465 |
| 7,079,812 | B2 * | 7/2006 | Miller et al. | 370/342 |
| 7,177,294 | B2 * | 2/2007 | Chen et al. | 370/338 |
| 7,193,965 | B1 * | 3/2007 | Nevo et al. | 370/230 |
| 7,277,413 | B2 * | 10/2007 | Benveniste | 370/338 |
| 2001/0010689 | A1 * | 8/2001 | Awater et al. | 370/344 |
| 2004/0242159 | A1 * | 12/2004 | Calderon et al. | 455/63.3 |
| 2005/0025104 | A1 * | 2/2005 | Fischer et al. | 370/338 |
| 2005/0025182 | A1 * | 2/2005 | Nazari | 370/469 |
| 2005/0026637 | A1 * | 2/2005 | Fischer et al. | 455/502 |
| 2005/0192048 | A1 * | 9/2005 | Bridgelall | 455/553.1 |
| 2006/0040709 | A1 * | 2/2006 | Adachi et al. | 455/562.1 |
| 2006/0041676 | A1 * | 2/2006 | Sherman | 709/231 |
| 2006/0211372 | A1 * | 9/2006 | Shellhammer et al. | 455/41.2 |
| 2007/0058665 | A1 * | 3/2007 | Ho et al. | 370/447 |

* cited by examiner

*Primary Examiner*—Anh-Vu Ly
(74) *Attorney, Agent, or Firm*—McDonnell Boehnen Hulbert & Berghoff LLP

(57) ABSTRACT

A technique is disclosed involves a station (e.g., an IEEE 802.11 station, etc.) requesting that one or more frames be transmitted from an access point to the station. The station might have been in power save mode during Bluetooth operation for the purpose of causing the access point to queue frames that are intended for the station. The station making the request is collocated with the Bluetooth station or is, in fact, a single station that supports two protocols (i.e., has two parts), and is able to determine the regular timing of the Bluetooth synchronous connected oriented (SCO) packet transmissions. The requests to the access point for IEEE 802.11 frames are timed to cause the access point response frames to fall between the Bluetooth messages, thus managing potential interference.

28 Claims, 9 Drawing Sheets

Start

Detect the end of a transmission of a first signal in accordance with a first protocol — 501

Transmit a second signal in accordance with a second protocol after the detecting of the end of the transmission, wherein the second signal conveys a PS_Poll frame — 502

Receive at least one data frame — 503

Stop

MANAGING AN ACCESS POINT IN THE PRESENCE OF SEPARATE PROTOCOLS THAT SHARE THE SAME COMMUNICATIONS CHANNEL

CROSS-REFERENCE TO RELATED APPLICATIONS

This application claims the benefit of:

1. U.S. provisional application Ser. No. 60/491,214, filed Jul. 30, 2003, entitled "Managing via an Access Point Coexistence of Separate Protocols Sharing the Same Communications Channel,", which is also incorporated by reference.

The following patent applications are incorporated by reference:

1. U.S. application Ser. No. 10/830,570, filed Apr. 23, 2004, entitled "Signaling Extended Functionality and Management Information in a Network,"; and
2. U.S. application Ser. No. 10/830,575, filed Apr. 23, 2004, entitled "Managing Coexistence of Separate Protocols Sharing the Same Communications Channel,".

FIELD OF THE INVENTION

The present invention relates to telecommunications in general, and, more particularly, to local area networks (LAN).

BACKGROUND OF THE INVENTION

FIG. 1 depicts a schematic diagram of wireless local-area network (LAN) 100 in the prior art comprising access point 101, stations 102-1 through 102-K, wherein K is a positive integer, and shared-communications channel 103. Stations 102-1 through 102-K are typically associated with host computers (not shown), such as notebook computers, personal digital assistants (PDA), tablet PCs, etc. Stations 102-1 through 102-K enable communications between (i) the host computers or (ii) the host computers and other devices, such as printer servers, email servers, file servers, etc. Access point 101 enables stations 102-1 through 102-K to (i) coordinate transmissions between each other and (ii) communicate with devices in other communications networks.

Access point 101 and stations 102-*k*, for k=1 through K, transmit data blocks called "frames" over shared-communications channel 103. If two or more stations (or access point 101 and a station) transmit frames simultaneously, then one or more frames can become corrupted, resulting in what is called a "collision". Local-area networks, therefore, typically employ a medium access control (MAC) protocol for ensuring that a station can gain exclusive access to shared-communications channel 103 for an interval of time in order to transmit one or more frames. A "protocol" is a set of communications procedures that relate to the format and timing of transmissions between different stations.

In wireless local-area networks that are based on the Institute of Electrical and Electronics Engineers (IEEE) 802.11 standard, the medium access control protocol is based on a mechanism called "carrier sense multiple access" (CSMA), in which station 102-*k* or access point 101 can detect whether shared-communications channel 103 is busy or idle. If shared-communications channel 103 is busy, station 102-*k* or access point 101 will wait until the channel is idle before attempting to transmit a signal that conveys a message.

Shared-communications channel 103 can be used by stations that operate in accordance with different protocols. For example, the IEEE 802.11 standard (e.g., 802.11a, 802.11b, 802.11e, 802.11g, etc.) describes one set of protocols, and the Bluetooth standard describes another set of protocols. A particular station (e.g., station 102-1, etc.) might handle an IEEE 802.11 protocol or a Bluetooth protocol, or both. A station that is capable of handling multiple protocols (i.e., a "multi-protocol station") comprises multiple protocol subsystems, or "parts", in which each part handles communications in accordance with a specific protocol.

Coordination of the IEEE 802.11 and Bluetooth protocols in a multi-protocol station can become particularly difficult when the Bluetooth part transmits or receives packets that are synchronous connection oriented (SCO) (e.g., voice packets, etc.), because such packets are often repeatedly transmitted at high data rates. As a result, Bluetooth coexistence mechanisms, such as the IEEE 802.15.2 set of standards, have been introduced in the prior art to address this problem. Such coexistence mechanisms coordinate a multi-protocol station's transmission of (i) Bluetooth synchronous connection oriented voice packets, and (ii) frames of another protocol. These mechanisms, however, do not prevent collisions that can occur when access point 101 transmits an IEEE 802.11 frame at the same time that a multi-protocol station transmits a Bluetooth packet.

Another approach in the prior art is to use the IEEE 802.11 Power Save state to cause access point 101 to queue outbound IEEE 802.11 traffic that is intended for station 102-*k*. The queuing occurs during the time that station 102-*k* indicates that it is inactive in the IEEE 802.11 sense as far as access point 101 is aware, but actually remains active in the Bluetooth sense. The technique of entering and exiting power save mode to allow time for Bluetooth operation, however, does not effectively support synchronous connection oriented operation of Bluetooth for some applications (e.g., voice, etc.). The repetition rate of synchronous connection oriented Bluetooth is so rapid that it is often impractical to rely on the IEEE 802.11 frames that indicate the rapid changes in power save state.

Therefore, a need exists for an improvement in how stations that operate in accordance with different protocols coexist with an access point without some of the costs and disadvantages in the prior art.

SUMMARY OF THE INVENTION

The present invention provides a technique for improving how stations that operate in accordance with different protocols coexist with an access point without some of the costs and disadvantages in the prior art. In the illustrative embodiment of the present invention, a station (e.g., an IEEE 802.11 station, etc.) requests that one or more frames be transmitted from an access point to the station. The station might have been in power save mode during Bluetooth operation for the purpose of causing the access point to queue frames that are intended for the station. The station that makes the request is collocated with the Bluetooth station or is, in fact, a single station that supports two protocols (i.e., has two parts), and is able to determine the regular timing of the Bluetooth synchronous connected oriented (SCO) packet transmissions. The requests to the access point for IEEE 802.11 frames are timed to cause the access point response frames to fall between the Bluetooth messages, thus managing potential interference.

In the first embodiment of the present invention, soon after detecting the end of a Bluetooth transmission, a station requesting data frames transmits a PS_Poll frame to request one or more IEEE 802.11 data frames from the access point. The access point responds to the PS_Poll frame with a data frame after an SIFS (short interframe space) delay. The station that transmits the PS_Poll frame does so, in some embodiments, without first determining whether or not a queued data frame exists at the access point for the station, thus minimizing the delay.

In the second embodiment of the present invention, soon after detecting the end of a Bluetooth transmission, a station requesting data frames transmits a Clear_to_Send (CTS) frame that specifies a particular "info-address" field value to request that the access point immediately transmit one or more IEEE 802.11 data frames to the requesting station. The CTS frame with info-address is sent with a non-zero duration value that is sufficient to cover the anticipated length of the data frame or frames, enabling network allocation vector (NAV) protection from stations that are able to detect the transmitted duration field value. NAV protection uses the IEEE 802.11 virtual carrier sense mechanism to cause stations that detect the frame exchange to set their internal carrier sense to the "busy" state, even if they do not sense radio frequency energy during the NAV protection interval. The CTS frame with info-address and the corresponding NAV protection are important in that the access point does not have to contend for the shared-communications channel being used, and possibly be delayed beyond the imposed interference-free interval at the receiving station.

In both the first and second embodiments, the frame (i.e., PS_Poll or CTS with info-address) that indicates readiness to receive at least one data frame can be transmitted by the requesting station to the access point without contending for the shared-communications channel. This can be the case, for example, when the station is already aware that previous NAV protection extends through at least the end of the Bluetooth transmission.

The illustrative embodiment is described in the context of Bluetooth and IEEE 802.11. However, it will be clear to those skilled in the art, after reading this specification, how to apply the illustrative embodiment of the present invention to other separate protocols.

An illustrative embodiment of the present invention comprises: detecting the end of a transmission of a first signal in accordance with a first protocol on a shared-communications channel; and transmitting a second signal in accordance with a second protocol on the shared-communications channel after the detecting of the end of the transmission, wherein the second signal conveys a readiness to receive at least one data frame.

DETAILED DESCRIPTION

Figure 1:
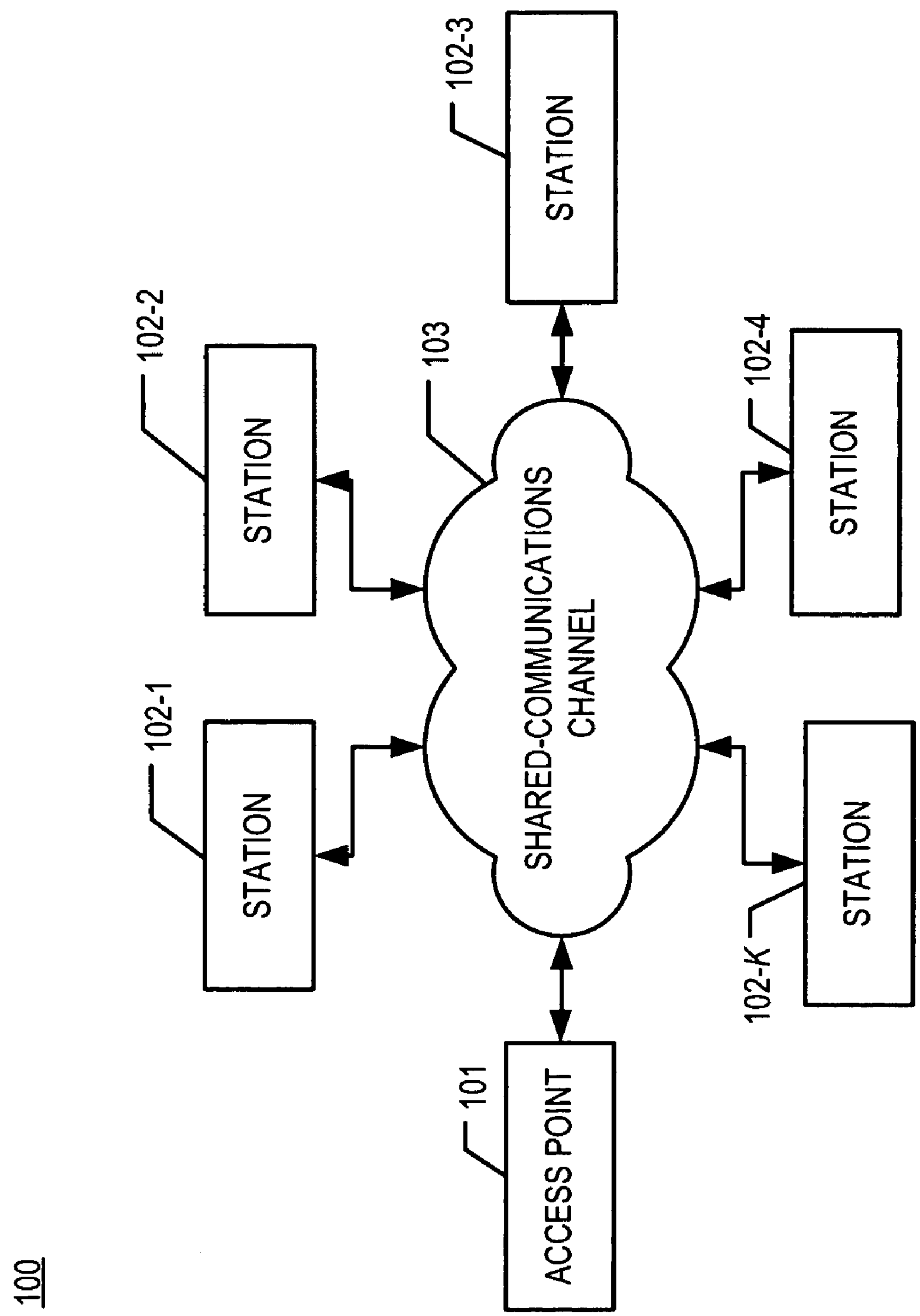
FIG. 1 depicts a schematic diagram of wireless local area network 100 in the prior art.
Figure 2:
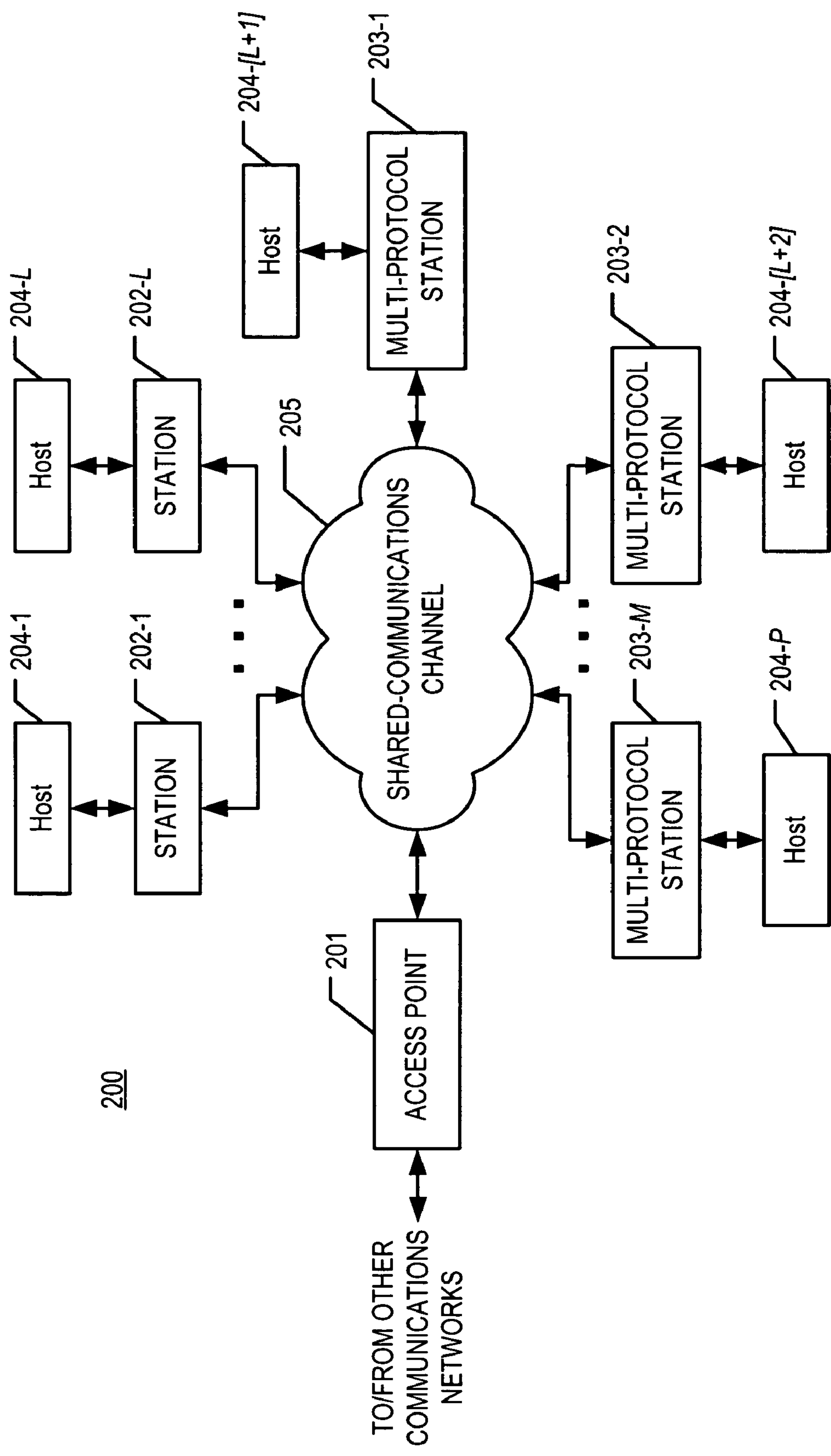
FIG. 2 depicts a schematic diagram of a portion of network 200 in accordance with the illustrative embodiment of the present invention.

FIG. 2 depicts a schematic diagram of network 200 in accordance with the illustrative embodiment of the present invention. Network 200 comprises access point 201; stations 202-1 through 202-L, wherein L is a positive integer; multi-protocol stations 203-1 through 203-M, wherein M is a positive integer; host computers 204-1 through 202-P, wherein P is a positive integer equal to L plus M; and wireless shared-communications channel 205, interconnected as shown. In some embodiments, network 200 is a wireless local area network.

Access point 201, stations 202-1 through 202-L, and multi-protocol stations 203-1 through 203-M operate in accordance with an IEEE 802.11 standard. Multi-protocol stations 203-1 through 203-M also operate in accordance with the Bluetooth standard.

It will be clear to those skilled in the art, after reading this specification, how to make and use embodiments of the present invention that operate in accordance with other protocols. Furthermore, it will be clear to those skilled in the art, after reading this specification, how to make and use embodiments of the present invention that use a wireline or tangible shared-communications channel.

Access point 201 enables stations 202-1 through 202-L and multi-protocol stations 203-1 through 203-M within network 200 to communicate with devices in other communications networks. Furthermore, because access point 201 coordinates communication over shared-communications channel 205, stations 202-1 through 202-L and multi-protocol stations 203-1 through 203-M communicate with each other through access point 201. The salient details of access point 201 are described below and with respect to FIG. 3.

Stations within network 200, in other embodiments, communicate directly with each other and without access point 201. It will be clear to those skilled in the art how to make and use stations that communicate with each other without access point 201.

Station 202-*i*, for i=1 through L, comprises a radio (i.e., a transmitter/receiver subsystem) that enables host computer 204-*i* to communicate via shared-communications channel 205 by using a single protocol only (i.e., IEEE 802.11 or Bluetooth, but not both). Station 202-*i* is capable of receiving data blocks from host computer 204-*i* and transmitting over shared-communications channel 205 messages (e.g., frames, packets, etc.) that comprise the data received from host computer 204-*i*. Station 202-*i* is also capable of receiving messages from shared-communications channel 205 and sending to host computer 204-*i* data blocks that comprise data from the messages. It will be clear to those skilled in the art how to make and use station 202-*i*.

Multi-protocol station 203-*i*, for i=1 through M, comprises the radios that enable host computer 204-(*i*+L) to communicate via shared-communications channel 205. Multi-protocol station 203-*i* is capable of receiving data blocks from host computer 204-(*i*+L) and transmitting over shared-communications channel 205 data messages comprising the data received from host computer 204-(*i*+L). Multi-protocol station 203-*i* is also capable of receiving data messages from shared-communications channel 205 and sending to host computer 204-(*i*+L) data blocks comprising data from the data messages. It will be clear to those skilled in the art, after reading this specification, how to make and use multi-protocol station 203-*i*. The salient details for multi-protocol station 203-*i* are described below and with respect to FIG. 4.

Host computer 204-*i*, for i=1 to P, is capable of generating data blocks and transmitting those data blocks to station 202-*i* or multi-protocol station 203-*j*, wherein j is equal to (i−L). Host computer 204-*i* is also capable of receiving data blocks from station 202-*i* or multi-protocol station 203-*j* and of processing and using the data contained within those data blocks. Host computer 204-*i* can be, for example, a desktop or a laptop computer that uses network 200 to communicate with other hosts and devices via access point 201. It will be clear to those skilled in the art how to make and use host computer 204-*i*.

Figure 3:
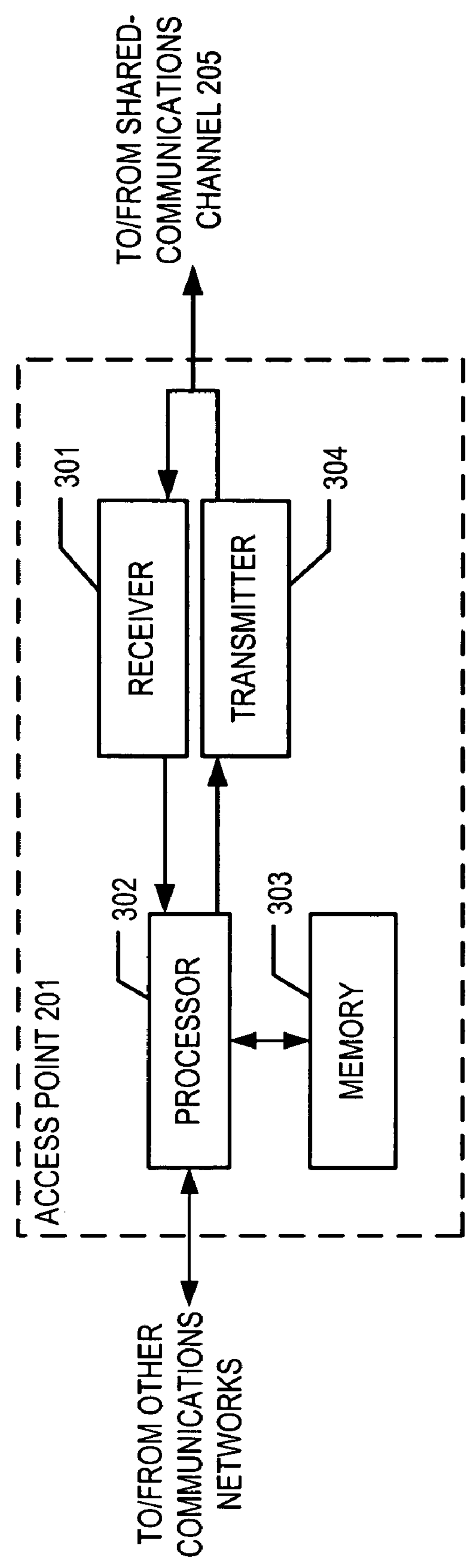
FIG. 3 depicts a block diagram of the salient components of access point 201 in accordance with the illustrative embodiment of the present invention.

FIG. 3 depicts a block diagram of the salient components of access point 201 in accordance with the illustrative embodiment of the present invention. Access point 201 comprises receiver 301, processor 302, memory 303, and transmitter 304, interconnected as shown.

Receiver 301 is a circuit that is capable of receiving messages from shared-communications channel 205, in well-known fashion, and of forwarding them to processor 302. It will be clear to those skilled in the art how to make and use receiver 301.

Processor 302 is a general-purpose processor that is capable of performing the tasks described below and with respect to FIGS. 7, 8, and 9. It will be clear to those skilled in the art, after reading this specification, how to make and use processor 302.

Memory 303 is capable of storing programs and data used by processor 302. It will be clear to those skilled in the art how to make and use memory 303.

Transmitter 304 is a circuit that is capable of receiving messages from processor 302, in well-known fashion, and of transmitting them on shared-communications channel 205. It will be clear to those skilled in the art how to make and use transmitter 304.

Figure 4:
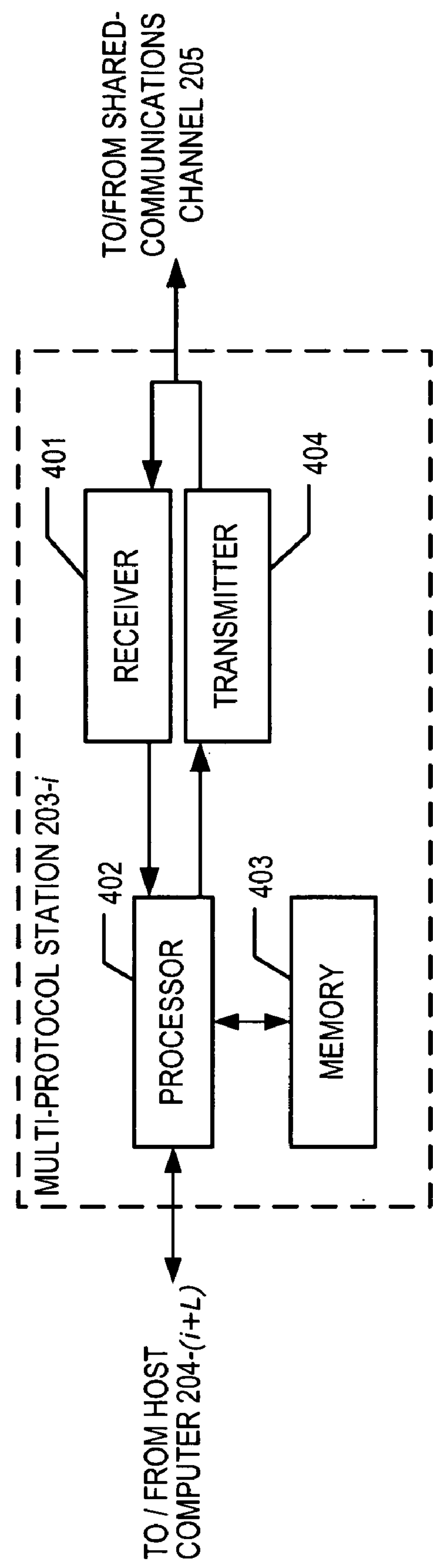
FIG. 4 depicts a block diagram of the salient components of multi-protocol station 203-*i* in accordance with the illustrative embodiment of the present invention.

FIG. 4 depicts a block diagram of the salient components of multi-protocol station 203-*i* in accordance with the illustrative embodiment of the present invention. Multi-protocol station 203-*i* comprises receiver 401-*i*, processor 402-*i*, memory 403-*i*, and transmitter 404-*i*, interconnected as shown.

Receiver 401-*i* is a circuit that is capable of receiving messages from shared-communications channel 205, in well-known fashion, and of forwarding them to processor 402-*i*. It will be clear to those skilled in the art how to make and use receiver 401-*i*.

Processor 402-*i* is a general-purpose processor that is capable of performing the tasks described below and with respect to FIGS. 5, 6, 8, and 9. It will be clear to those skilled in the art, after reading this specification, how to make and use processor 402-*i*.

Memory 403-*i* is capable of storing programs and data used by processor 402-*i*. It will be clear to those skilled in the art how to make and use memory 403-*i*.

Transmitter 404-*i* is a circuit that is capable of receiving messages from processor 402-*i*, in well-known fashion, and of transmitting them on shared-communications channel 205. It will be clear to those skilled in the art how to make and use transmitter 404-*i*.

Multi-protocol station 203-*i* comprises a single receiver/transmitter pair, in accordance with the illustrative embodiment of the present invention. Receiver 401-*i* and transmitter 404-*i* are each capable of communicating in accordance with both the IEEE 802.11 protocol and the Bluetooth protocol. In other embodiments, multi-protocol station 203-*i* comprises multiple receiver/transmitter pairs, where each pair handles a specific protocol (e.g., IEEE 802.11, Bluetooth, etc.).

Figure 5:
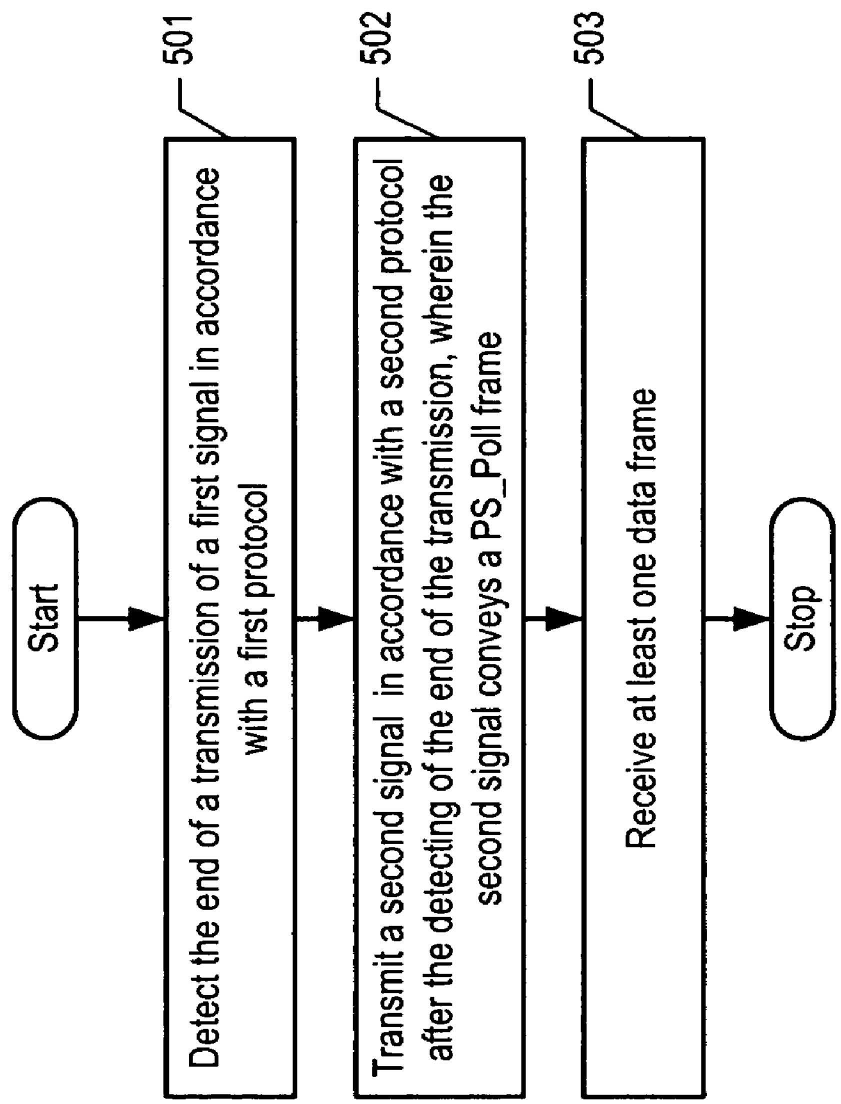
FIG. 5 depicts a flowchart of the salient tasks performed by multi-protocol station 203-*i* in accordance with the first illustrative embodiment of the present invention.

FIG. 5 depicts a flowchart of the salient tasks performed by multi-protocol station 203-*i* in accordance with the first illustrative embodiment of the present invention. Multi-protocol station 203-1 and access point 201 are used as examples. For illustrative purposes, it is assumed that multi-protocol station 203-1 supports the IEEE 802.11 and Bluetooth protocols. In the example provided, Bluetooth is the first protocol and IEEE 802.11 is the second protocol.

At task 501, multi-protocol station 203-1 detects the end of a transmission of a first signal in accordance with the Bluetooth protocol on shared-communications channel 205. This can be determined, for example, through packet traffic arbitration between IEEE 802.11 and Bluetooth medium access control, as is known in the art. It will be clear to those skilled in the art how to detect the end of a transmission.

At task 502, multi-protocol station 203-1 transmits to access point 201 a PS_Poll frame as is known in the art into shared-communications channel 205 and by using the IEEE 802.11 protocol. In some embodiments, multi-protocol station 203-1 transmits the PS_Poll frame without first determining if a data frame that is intended for multi-protocol station 203-1 exists at access point 201. It will be clear to those skilled in the art how to transmit a PS_Poll frame.

At task 503, multi-protocol station 203-1 receives in well-known fashion at least one IEEE 802.11 data frame from access point 201.

Figure 6:
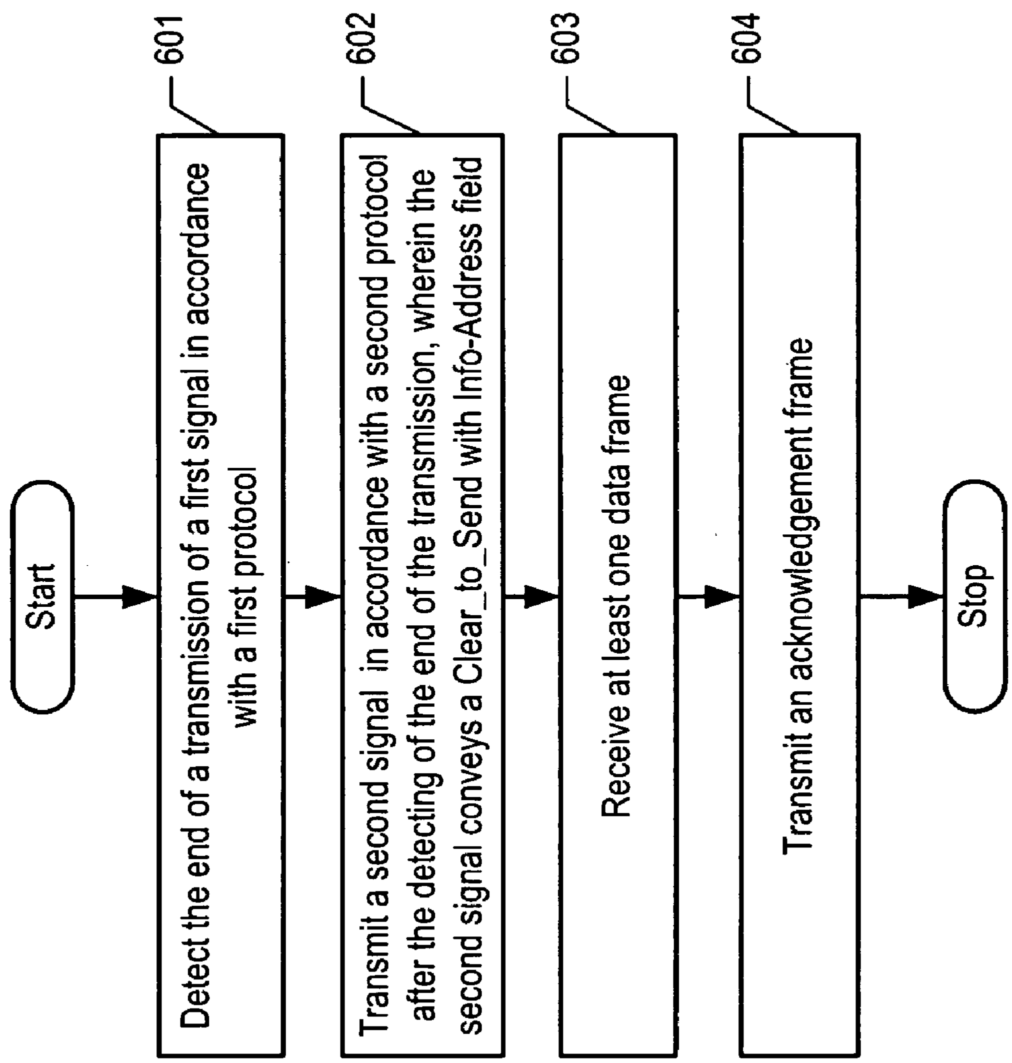
FIG. 6 depicts a flowchart of the salient tasks performed by multi-protocol station 203-*i* in accordance with the second illustrative embodiment of the present invention.

FIG. 6 depicts a flowchart of the salient tasks performed by multi-protocol station 203-*i* in accordance with the second illustrative embodiment of the present invention. Multi-protocol station 203-1 and access point 201 are used as examples. For illustrative purposes, it is assumed that multi-protocol station 203-1 supports the IEEE 802.11 and Bluetooth protocols. In the example provided, Bluetooth is the first protocol and IEEE 802.11 is the second protocol.

At task 601, multi-protocol station 203-1 detects the end of a transmission of a first signal in accordance with the Bluetooth protocol on shared-communications channel 205. This can be determined, for example, through packet traffic arbitration between IEEE 802.11 and Bluetooth medium access control, as is known in the art. It will be clear to those skilled in the art how to detect the end of a transmission.

At task 602, multi-protocol station 203-1 transmits to access point 201 a Clear_to_Send frame as is known in the art into shared-communications channel 205 and by using the IEEE 802.11 protocol. The Clear_to_Send frame comprises a receiver address field and a duration field, as are known in the art.

The receiver address field conveys an info-address value. Info-address is described further in U.S. patent application Ser. No. 10/830,570. The info-address value that is used in the illustrative embodiment indicates that access point 201 transmit at least one data frame without first contending for shared-communications channel 205. The info-address value also conveys information that indicates that access point 201 is the intended recipient of the frame. For example, the info-address value can comprise at least a portion of access point 201's latest timing synchronization function (TSF) value, as is known in the art, which is unlikely to be the same as the latest timing synchronization function value of another, nearby access point. It will be clear to those skilled in the art, after reading this specification, how to encode information as part of the info-address value to indicate an intended recipient.

The duration field has a value based on the expected length of time required for access point 201 to transmit at least a first data frame. The duration field is used by other stations within network 200 to update their network allocation vectors in well-known fashion. This enables access point 201 to transmit without having to contend for shared-communications channel 205 and without incurring delay.

In other embodiments, multi-protocol station 203-1 transmits a different type of frame (i.e., other than Clear_to_Send) that conveys the info-address. It will be clear to those skilled in the art, after reading this specification, how to transmit a frame (e.g., Clear_to_Send, etc.) that conveys the info-address.

At task 603, multi-protocol station 203-1 receives in well-known fashion at least one IEEE 802.11 data frame from access point 201.

At task 604, multi-protocol station 203-1 transmits to access point 201 an acknowledgement frame in well-known fashion. In some embodiments, the acknowledgement frame comprises a duration field with a value that sets the network allocation vector to zero, having the effect of allowing all stations to contend for shared-communications channel 205.

Figure 7:
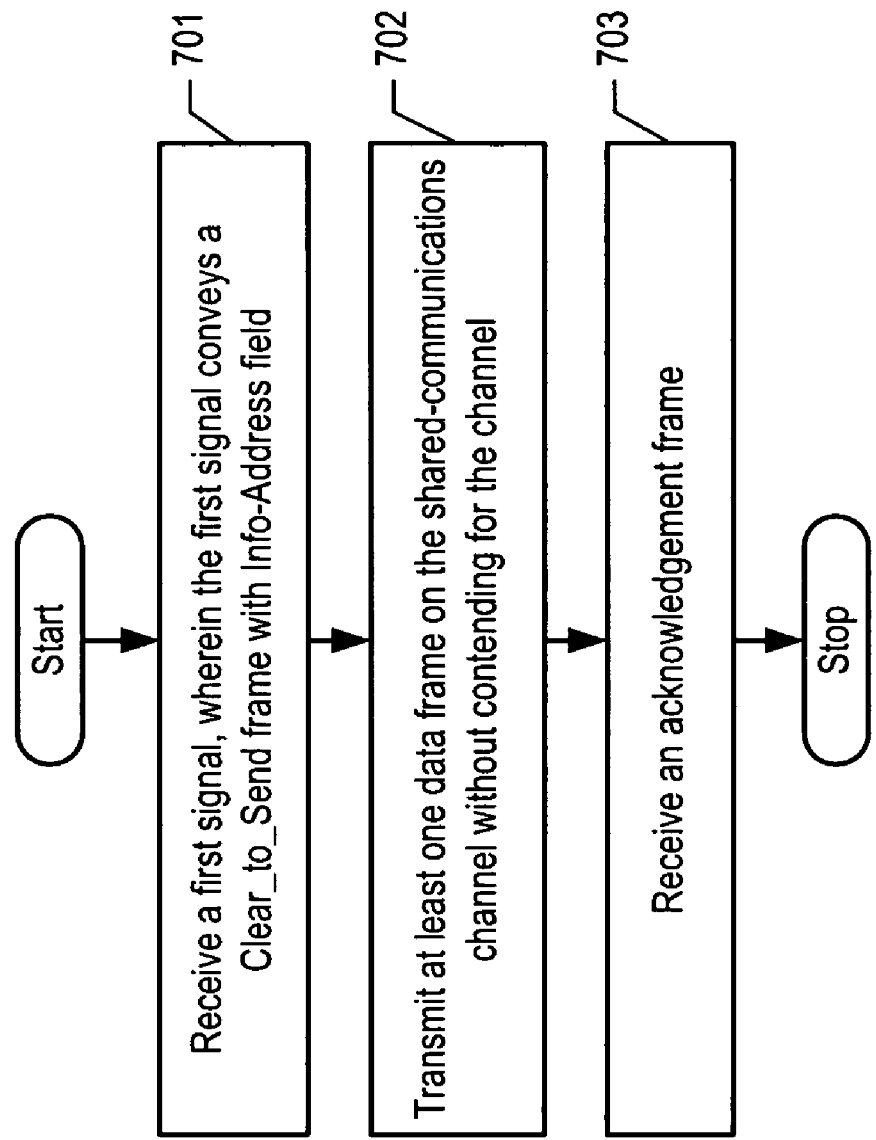
FIG. 7 depicts a flowchart of the salient tasks performed by access point 201, in accordance with the second illustrative embodiment of the present invention.

FIG. 7 depicts a flowchart of the salient tasks performed by access point 201 in accordance with the second illustrative embodiment of the present invention. Multi-protocol station 203-1 is also used as an example.

At task 701, access point 201 receives from multi-protocol station 203-1 a first signal on shared-communications channel 205. The first signal conveys a Clear_to_Send frame that comprises an info-address field and a duration field. The info-address field and duration field were described earlier in conjunction with FIG. 6.

At task 702, access point 201 transmits to multi-protocol station 203-1 at least one IEEE 802.11 data frame in well-known fashion. Because access point 201 transmits one or more data frames in response to receiving a Clear_to_Send message with the info-address field value of the illustrative embodiment, access point 201 transmits the data frame or frames without contending for shared-communications channel 205 and without having to incur the added delay.

At task 703, in some embodiments, access point 201 receives an acknowledgement frame in well-known fashion.

Figure 8:
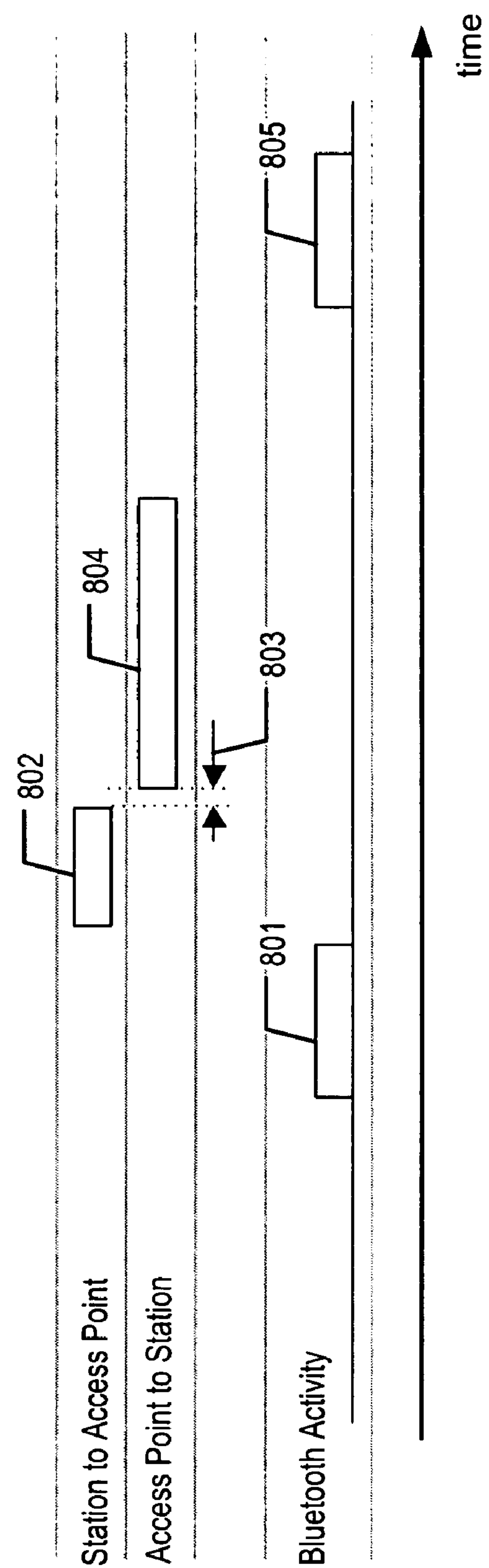
FIG. 8 depicts a sequence of messages exchanged in accordance with the first illustrative embodiment of the present invention.

FIG. 8 depicts a sequence of messages (e.g., frames, packets, etc.) in accordance with the first illustrative embodiment of the present invention. Multi-protocol station 203-1 is used in the example. For illustrative purposes, it is assumed that multi-protocol station 203-1 supports the IEEE 802.11 and Bluetooth protocols. The Bluetooth part of multi-protocol station 203-1 has to transmit High Quality Voice 3 (HV3) packets every 3.75 milliseconds with each packet being 625 microseconds in length. The IEEE 802.11 part of multi-protocol station 203-1 can be made aware of this transmission requirement in the course of monitoring for transmit opportunities.

Alternatively, the illustrative embodiment also supports the scenario in which the IEEE 802.11 and the Bluetooth part are in separate stations that are able to exchange transmission requirements with each other, and have to coexist with other stations. It will be clear to those skilled in the art, after reading this specification, how to apply the illustrative embodiment to two different stations operating in accordance with two different protocols.

As part of Bluetooth activity interval 801, multi-protocol station 203-1 detects the end of a transmission of a first protocol message (e.g., a Bluetooth HV3 [or "High Quality Voice 3"] packet, etc.) on shared-communications channel 205. Detecting can be performed in a variety of ways. In the illustrative example, the second protocol part of multi-protocol station 203-1 coexists with the first protocol (e.g., Bluetooth, etc.) part and, as a result, can detect status directly on the Bluetooth part's shared-communications channel usage. Alternatively, the second protocol part of multi-protocol station 203-1 might sense first protocol activity ending on shared-communications channel 205. It will be clear to those skilled in the art how to detect the end of a transmission.

The second protocol part (e.g., the IEEE 802.11 part, etc.) of multi-protocol station 203-1 transmits PS_Poll frame 802 to access point 201 on shared-communications channel 205 using the second protocol. PS_Poll frame 802 indicates readiness to receive at least one data frame.

In some embodiments, PS_Poll frame 802 can be transmitted without contending for shared-communications channel 205. This can be the case, for example, when multi-protocol station 203-1 is already aware that previously-imposed network allocation vector (NAV) protection extends through at least the end of the transmission of the first protocol message. For example, multi-protocol 203-1 itself might have already set the network allocation vector. One such technique is described further in U.S. patent application Ser. No. 10/830,575.

After waiting for short interframe space (SIFS) interval 803, access point 201 responds to PS_Poll frame 802 with at least one data frame during interval 804.

As part of Bluetooth activity interval 805, the first protocol part of multi-protocol station 203-1 transmits, in some embodiments, another first protocol message (e.g., a Bluetooth HV3 [or "High Quality Voice 3"] packet, etc.) on shared-communications channel 205.

Figure 9:
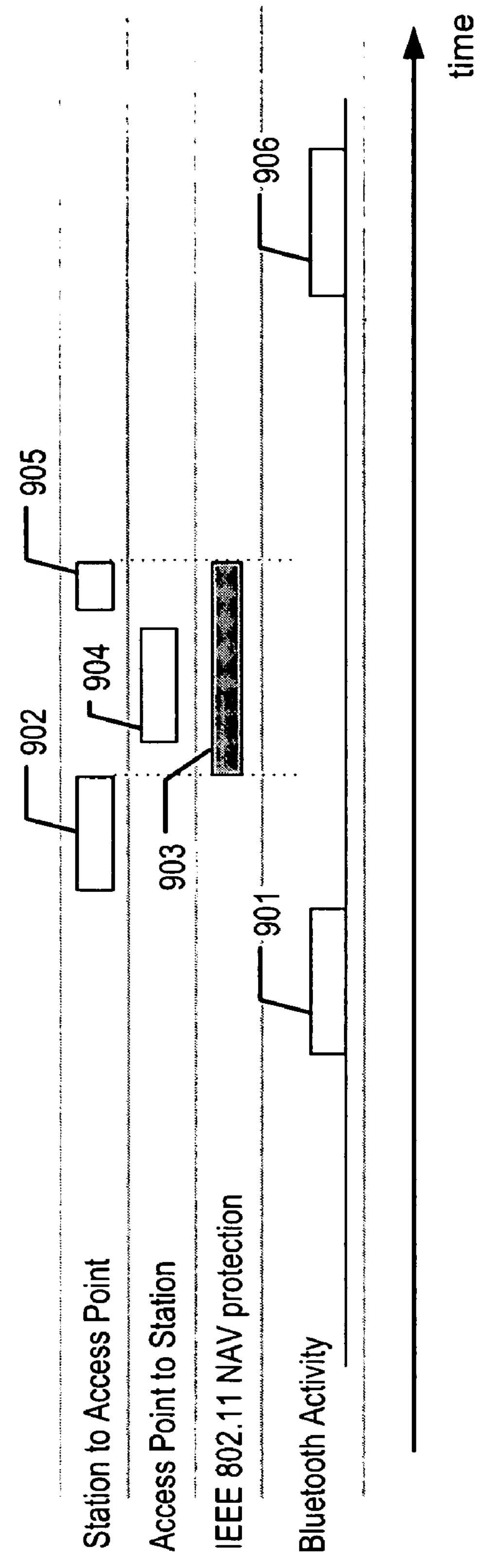
FIG. 9 depicts a sequence of messages exchanged in accordance with the second illustrative embodiment of the present invention.

FIG. 9 depicts a sequence of messages (e.g., frames, packets, etc.) in accordance with the second illustrative embodiment of the present invention. Multi-protocol station 203-1 is used in the example. For illustrative purposes, it is assumed that multi-protocol station 203-1 supports the IEEE 802.11 and Bluetooth protocols. The Bluetooth part of multi-protocol station 203-1 has to transmit High Quality Voice 3 (HV3) packets every 3.75 milliseconds with each packet being 625 microseconds in length. The IEEE 802.11 part of multi-protocol station 203-1 can be made aware of this transmission requirement in the course of monitoring for transmit opportunities.

Alternatively, the illustrative embodiment also supports the scenario in which the IEEE 802.11 and the Bluetooth part are in separate stations that are able to exchange transmission requirements with each other, and have to coexist with other stations. It will be clear to those skilled in the art, after reading this specification, how to apply the illustrative embodiment to two different stations operating in accordance with two different protocols.

As part of Bluetooth activity interval 901, multi-protocol station 203-1 detects the end of a transmission of a first protocol message (e.g., a Bluetooth HV3 [or "High Quality Voice 3"] packet, etc.) on shared-communications channel 205. Detecting can be performed in a variety of ways. In the illustrative example, the second protocol part of multi-protocol station 203-1 coexists with the first protocol (e.g., Bluetooth, etc.) part and, as a result, can detect status directly on the Bluetooth part's shared-communications channel usage. Alternatively, the second protocol part of multi-protocol station 203-1 might sense first protocol activity ending on shared-communications channel 205. It will be clear to those skilled in the art how to detect the end of a transmission.

The second protocol part (e.g., the IEEE 802.11 part, etc.) of multi-protocol station 203-1 transmits Clear_to_Send frame 902 that specifies an info-address to access point 201 on shared-communications channel 205 using the second protocol. Multi-protocol station 203-1 specifies within the message a duration field value based on the expected length of time required to transmit at least one data frame in accordance with the second protocol on shared-communications channel 205. Network allocation vector (NAV) protection interval 903 represents the specified length of time. Clear_to_Send frame 902 that comprises the specific info-address is used to solicit a response from access point 201, while setting the NAV of other nearby stations, preventing access point 201 from having to contend for shared-communications channel 205 and from incurring delay. Clear_to_Send frame 902 indicates readiness to receive at least one data frame.

In some embodiments, Clear_to_Send frame 902 can be transmitted without contending for shared-communications channel 205. This can be the case, for example, when multi-protocol station 203-1 is already aware that previously-imposed network allocation vector (NAV) protection extends through at least the end of the transmission of the first protocol message. For example, multi-protocol 203-1 itself might have already set the network allocation vector, as for the case of PS_Poll frame 802.

During interval 904, access point 201 responds to the Clear_to_Send that comprises info-address with at least one data frame.

Multi-protocol station 203-1 operating in accordance with the second protocol transmits acknowledgement frame 905 in response to the data frame or frames from access point 201. Acknowledgement frame 905, in some embodiments, comprises a duration field with a value that effectively ends network allocation vector protection interval 903.

As part of Bluetooth activity interval 906, the first protocol part of multi-protocol station 203-1 transmits, in some embodiments, another first protocol message (e.g., a Bluetooth HV3 [or "High Quality Voice 3"] packet, etc.) on shared-communications channel 205.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:

detecting, at a multi-protocol station, an end of a transmission of a first signal in accordance with a first protocol on a shared-communications channel; and transmitting via the multi-protocol station a second signal in accordance with a second protocol on the shared-communications channel after detecting the end of the transmission, wherein the second signal comprises a receiver address field indicating an intended recipient and a duration field indicating a length of time for the intended recipient to transmit at least one data frame without contention, and wherein the second signal is transmitted during a time period previously reserved for the transmission of the first signal.

2. The method of claim 1, wherein the second signal is a PS_Poll frame.

3. The method of claim 1, further comprising receiving the at least one data frame from the intended recipient.

4. The method of claim 1, wherein the transmitting of the second signal occurs without first determining that the at least one data frame exists.

5. The method of claim 1, wherein the second signal is a Clear_to_Send frame and wherein the receiver address field comprises an info-address field.

6. The method of claim 5, wherein the value of the duration field covers at least time needed to transmit the at least one data frame.

7. The method of claim 1, further comprising:

transmitting an acknowledgement frame, wherein a duration field value of the acknowledgement frame is set equal to zero.

8. The method of claim 1, wherein the first protocol is Bluetooth-based and the second protocol is IEEE 802.11-based.

9. An apparatus comprising:

a processor;

a receiver, configured to receive messages on a shared-communications channel and to forward the messages to the processor;

a transmitter configured to receive messages from the processor and to transmit the messages on the shared-communications channel; and a memory, configured to store programs and data, the programs executable by the processor to perform tasks, the tasks comprising:

detecting an end of a transmission of a first message sent on the shared-communication channel in accordance with a first protocol, after detecting the end of the transmission, generating a second message in accordance with a second protocol, wherein the second message comprises a receiver address field indicating an intended recipient and a duration field indicating a length of time for the intended recipient to transmit at least one data frame without contention, and wherein the second message is transmitted during a time period previously reserved for the transmission of the first message, and sending the second message to the transmitter.

10. The apparatus of claim 9, wherein the second message is a PS_Poll frame.

11. The apparatus of claim 9, wherein the receiver is further configured to receive the at least one data frame from the intended recipient.

12. The apparatus of claim 9, wherein sending the second message to the transmitter occurs without first determining if the at least one data frame exists.

13. The apparatus of claim 9, wherein the second message is a Clear_to_Send frame.

14. The apparatus of claim 9, wherein the tasks further comprise:

generating an acknowledgement frame, wherein a duration field value of the acknowledgement frame is set equal to zero; and sending a message comprising the acknowledgment frame to the transmitter.

15. The apparatus of claim 9, wherein the first protocol is Bluetooth-based and the second protocol is IEEE 802.11-based.

16. A system comprising:

means for reserving a predetermined period of time for transmitting a first signal in accordance with a first protocol on a shared-communications channel;

means for detecting an end of a transmission of the first signal in accordance with the first protocol on the shared-communications channel, wherein the end of the transmission of the first signal occurred prior to an expiration of the predetermined period of time; and means for transmitting a second signal in accordance with a second protocol on the shared-communications channel after the detecting of the end of the transmission of the first signal, wherein the second signal conveys a readiness to receive at least one data frame using the second protocol, and the second signal is transmitted during the predetermined period of time.

17. The system of claim 16, wherein the second signal is a PS_Poll frame.

18. The system of claim 17, further comprising means for receiving the at least one data frame from a recipient of the PS_Poll frame.

19. The system of claim 17, wherein the means for transmitting transmits the PS_Poll frame without first determining that the at least one data frame exists.

20. The system of claim 16, wherein the second signal is a Clear_to_Send frame that comprises an info-address field and a duration field.

21. The system of claim 20, wherein the value of the info-address field indicates that a recipient of the Clear_to_Send frame transmits the at least one data frame without first contending for the shared-communications channel.

22. The system of claim 20, wherein the value of the duration field covers at least time needed to transmit the at least one data frame.

23. The system of claim 20, further comprising means for receiving the at least one data frame from a recipient of the Clear_to_Send frame.

24. The system of claim 23, further comprising means for transmitting an acknowledgement frame, wherein a duration field value of the acknowledgement frame is set equal to zero.

25. The system of claim 16, wherein the first protocol is Bluetooth-based and the second protocol is IEEE 802.11-based.

26. A system comprising:

means for reserving a predetermined period of time for transmitting a second signal in accordance with a second protocol on a shared-communications channel;

means for receiving a first signal in a first protocol on the shared-communications channel, wherein the first signal comprises a frame, the frame comprising an info-address field and a duration field, wherein the duration field covers an expected length of time to transmit at least one data frame, and wherein the first signal is transmitted during the predetermined period of time previously reserved for transmission of the second signal in accordance with the second protocol; and means for transmitting the at least one data frame using the first protocol on the shared-communications channel without first contending for the shared-communications channel;

wherein the info-address field indicates that a recipient of the frame transmit the at least one data frame without first contending for the shared-communications channel.

27. The system of claim 26, wherein the frame is a Clear_to_Send frame.

28. The system of claim 26, further comprising means for receiving an acknowledgement frame.

* * * * *